US012626612B2

(12) United States Patent
Sahu et al.

(10) Patent No.: US 12,626,612 B2
(45) Date of Patent: May 12, 2026

(54) SYSTEM AND METHOD OF TACTILE BASED DISPLAY (IMAGE) ADAPTATION OF VIDEOCONFERENCE PROCEEDINGS

(71) Applicant: Mitel Networks Corporation, Kanata (CA)

(72) Inventors: Birendra Kumar Sahu, Bangalore (IN); Logendra Naidoo, Ottawa (CA)

(73) Assignee: Mitel Networks Corporation, Konata (CA)

( * ) Notice: Subject to any disclaimer, the term of this patent is extended or adjusted under 35 U.S.C. 154(b) by 357 days.

(21) Appl. No.: 18/231,151

(22) Filed: Aug. 7, 2023

(65) Prior Publication Data

US 2025/0054411 A1     Feb. 13, 2025

(51) Int. Cl.
| | |
|---|---|
| *G09B 21/00* | (2006.01) |
| *G06T 17/00* | (2006.01) |
| *G06V 20/70* | (2022.01) |
| *H04N 7/15* | (2006.01) |

(52) U.S. Cl.
CPC ............ *G09B 21/003* (2013.01); *G06T 17/00* (2013.01); *G06V 20/70* (2022.01); *H04N 7/152* (2013.01); *H04N 7/157* (2013.01); *G06V 2201/07* (2022.01)

(58) Field of Classification Search
CPC .............................. G09B 21/003; G06T 17/00
See application file for complete search history.

(56) References Cited

U.S. PATENT DOCUMENTS

| | | | |
|---|---|---|---|
| 5,736,978 A | 4/1998 | Hasser et al. | |
| 5,990,931 A * | 11/1999 | Nimri | H04N 7/147 |
| | | | 353/121 |
| 7,352,356 B2 | 4/2008 | Roberts et al. | |
| 10,490,102 B2 | 11/2019 | Djugash | |
| 10,540,445 B2 | 1/2020 | Albouyeh et al. | |
| 11,033,187 B2 | 6/2021 | Li et al. | |
| 2002/0003469 A1* | 1/2002 | Gupta | H04M 1/2476 |
| | | | 340/407.1 |

(Continued)

FOREIGN PATENT DOCUMENTS

WO        2022087147 A1     4/2022

OTHER PUBLICATIONS

Research Gate, "Braille Recognition using a Camera-enabled Smartphone", retrieved from Internet on Sep. 13, 2023 at researchgate.net/publication/305001944/.

(Continued)

*Primary Examiner* — James S. McClellan

(57)        ABSTRACT

A conferencing system and method detects one or more two-dimensional (2D) images in presented 2D data and/or objects shown during a videoconference and renders them on a participant's three-dimensional (3D) tactile screen. The system includes a conferencing server that is in communication with one or more participant devices. An image recognition engine is in communication with the conferencing server and identifies the one or more 2D images. An imaging processor is in communication with the image recognition engine, and may be in communication with a camera that recognizes objects shown during the videoconference. The imaging processor creates a 3D rendering of the 2D images and/or the objects and directly or indirectly sends them to the participant's 3D tactile screen.

19 Claims, 7 Drawing Sheets

Adaptation to participant's braille device

(56) References Cited

U.S. PATENT DOCUMENTS

| | | | |
|---|---|---|---|
| 2012/0319981 | A1 | 12/2012 | Habas |
| 2013/0016175 | A1* | 1/2013 | Alberth .................... H04N 7/15 348/E7.083 |
| 2014/0281997 | A1 | 9/2014 | Fleizach et al. |
| 2018/0165989 | A1* | 6/2018 | Cho ........................ G06F 3/016 |
| 2019/0138598 | A1* | 5/2019 | Albouyeh ............ G09B 21/006 |
| 2020/0090547 | A1* | 3/2020 | Kim .................. H04M 1/72481 |
| 2020/0118463 | A1* | 4/2020 | Khermayer .......... G09B 21/005 |
| 2021/0157872 | A1* | 5/2021 | David ................... G06F 40/279 |
| 2021/0182544 | A1* | 6/2021 | Sova ................... H04L 12/1822 |
| 2023/0360559 | A1* | 11/2023 | Chari .................. G09B 21/004 |
| 2024/0163390 | A1* | 5/2024 | Hutto .................. H04N 5/2628 |

OTHER PUBLICATIONS

Denise Prescher et al: "A tactile windowing system for blind users", Computers and Accessibility, ACM, 2 Penn Plaza, Suite 701 New York NY 10121-0701 USA, XP058199382, DOI: 10.1145/1878803. 1878821, ISBN: 978-1-60558-881-0, Oct. 25, 2010, pp. 91-98.

Prescher Denise et al: "Touching graphical applications: bimanual tactile interaction on the HyperBraille pin-matrix display", Universal Access in the Information Society: International journal, Springer Verlag, Berlin, DE, vol. 17, No. 2, XP036521962, ISSN: 1615-5289, DOI: 10.1007/S10209-017-0538-8, [retrieved on Apr. 5, 2017], Apr. 5, 2017, pp. 391-409.

Holloway Leona Leona Holloway@Monash Edu et al: "Animations at Your Fingertips: Using a Refreshable Tactile Display to Convey Motion Graphics for People who are Blind or have Low Vision", Proceedings of the 17th ACM Workshop on Mobility in the Evolving Internet Architecture, ACMPUB27, New York, NY, USA, XP058908393, DOI: 10.1145/3517428.3544797, ISBN: 978-1-4503-9657-8, Oct. 22, 2022, pp. 1-16.

Kohlmann Wiebke et al: "Alternative Concepts for Accessible Virtual Classrooms for Blind Users", 2015 IEEE 15th International Conference on Advanced Learning Technologies, IEEE, XP033205216, DOI: 10.1109/ICALT.2015.9, [retrieved on Sep. 14, 2015], Jul. 6, 2015, pp. 413-417.

* cited by examiner

A 3-D representation of an image displayed on the tactile screen that a visually impaired participant can touch and feel.

52

50

Automatically generated description (text) of the image that is converted to braille and displayed on the participant's braille device

54

Caption generated: Sunlight falling on a sunflower

Braille displayed on the participant's braille device:

56

SYSTEM AND METHOD OF TACTILE BASED DISPLAY (IMAGE) ADAPTATION OF VIDEOCONFERENCE PROCEEDINGS

BACKGROUND

Most available collaboration tools support video conferencing and due to work-from-home options available, video conferencing usage has increased. There are a variety of collaboration tools that can be used by visually-impaired people (which includes people who have low vision). These include audio-conferencing tools, text-to-speech software, text-based communication tools, screen reader software, and online collaboration platforms. However, none of these tools has a feature that assists visually-impaired people to understand and interact with visual images or objects (versus braille text being supplied).

There are existing tools that can read text that is displayed on a screen and convert the text to braille, but this is limited to text and does not help in detecting and converting to a three-dimensional (3D) rendering of objects or of two-dimensional (2D) images in a videoconference and/or within a defined videoconferencing field. Including such a feature in a videoconferencing tool would provide visually impaired people on expanded perception of the videoconference.

Some collaboration tools are available for visually-impaired people and examples include: (1) Audio conferencing tools, which allow users to participate in audio-only conference calls. These include Zoom, Skype, and Google Meet. (2) Text-to-speech software. This type of software converts written text into spoken words, which can be helpful for people who are visually impaired when reading written documents. Examples include NaturalReader and TextAloud. (3) Text-based communication tools such as Slack and Microsoft Teams, which allow users to communicate with each other using text-based messages. This can be easier for people who are visually impaired as compared to video conferencing tools. (4) Screen reader software, which speaks the contents of a computer screen to users who are visually impaired. Examples include JAWS and NVDA. (5) Online collaboration platforms such as Google Docs and Microsoft Office 365, which allow multiple users to work on the same document or spreadsheet in real-time. This can be useful for people who are visually impaired and must collaborate with others.

SUMMARY

Systems and methods according to this disclosure provide, along with the text being displayed on a videoconference screen being converted to braille for visually-impaired participants, the detection of 2D images, and optionally objects (which may be 3D), and displaying (or rendering) them on a tactile 3D screen of the visually-impaired participant. Such a system and method can also generate a caption/description of the 2D image or of the object, wherein the caption/description is displayed in braille. The systems and methods herein thus involve turning the imagery of a videoconference into tactile 3D objects, wherein a visually-impaired person can feel the shapes of things such as faces, 2D images, and/or objects (which may be 3D).

The systems and methods of this disclosure provide one or more of (1) an automated recognition and identification of a 2D image or of an object that is being displayed, and providing a 3D rendering and optionally an identification of the 3D rendering in braille. This 2D image/object information can be analyzed and detected using object identification (e.g., AutoML Vision Object Detection), and then represented in braille on a participant device. A method/system according to this disclosure may also convert videoconference text to braille on a participant's device.

BRIEF DESCRIPTION OF THE DRAWINGS

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein like numerals denote like elements and wherein:

Figure 1:
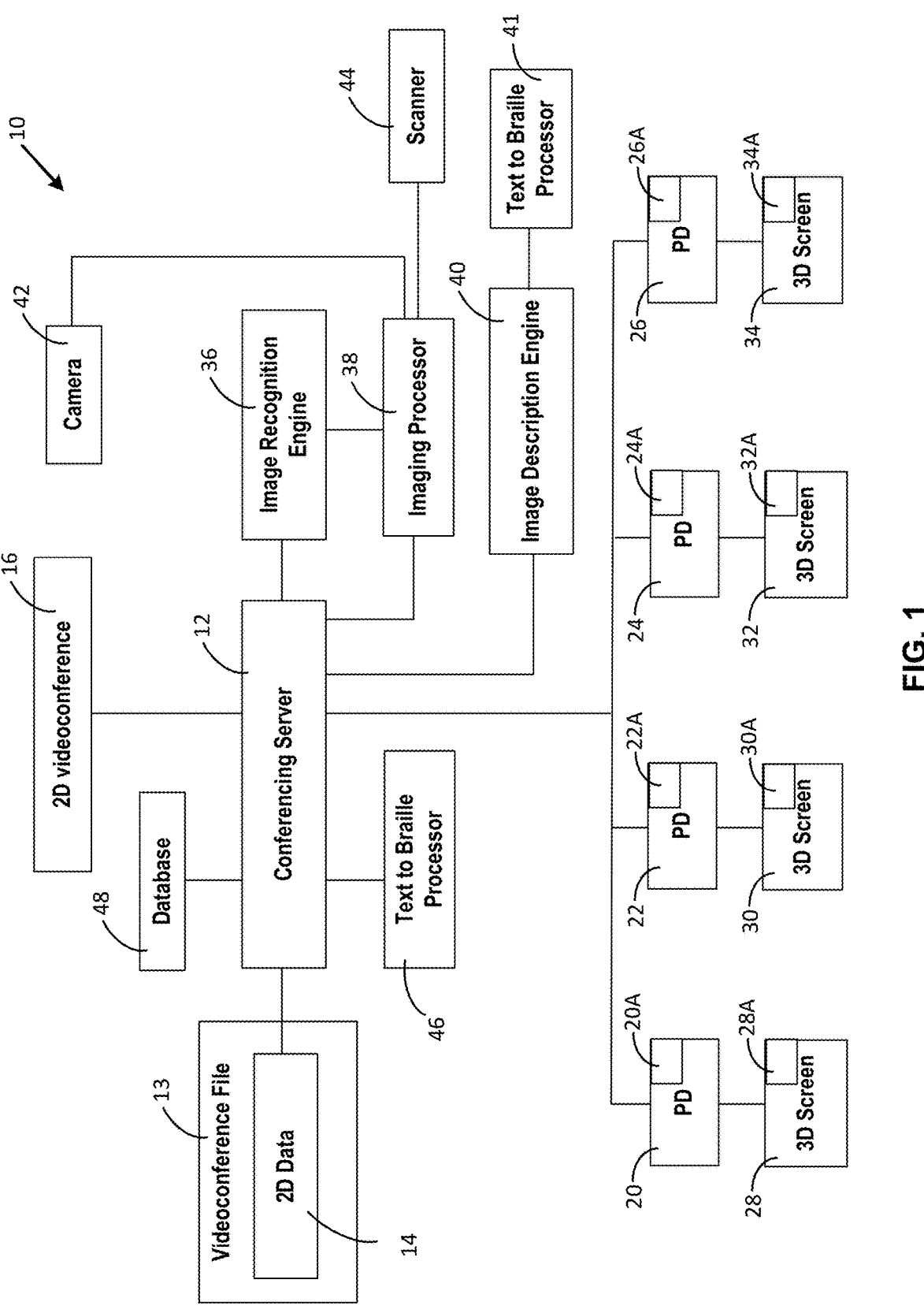
FIG. 1 is an exemplary system according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

Visually-impaired users can join a videoconference via their preferred collaboration tool, e.g., MiTeam Meetings, Zoom, Microsoft Teams, etc. The videoconference host can share the videoconference screen and begins the videoconference. This disclosure includes systems and methods that recognize a 2D image (such as a photograph, graph, or other 2D image) in the videoconference, and/or an object that is, for example, being held by the videoconference host. The systems and methods include a real-time tactile interpretation device that generates a 3D, protrusion-based (such as braille) image that a visually-impaired participant can touch to feel the shape of the object represented by a 2D image or an object held by the videoconference host, or otherwise.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Turning now to the Figures, wherein the purpose is to describe embodiments of this disclosure and not to limit the scope of the claims, FIG. 1 shows a system 10. System 10 includes a conferencing server 12 that communicates with and accesses 2D data 14 (which may be part of a videoconference file 13), which can be resident on any device or database, including the conference server 12. Utilizing the 2D data (also referred to as 2D conference data or 2D videoconference data), conference server 12 plays a 2D conference 16 that contains 2D images and the 2D video-conference 16 may also include text.

Conferencing server 12 is configured to communicate with participant devices 20, 22, 24, 26, or any number from 1-n of participant devices. Each participant device is associated with a unique participant and has a respective graphical user interface (GUI) 20A, 22A, 24A, and 26A, through which a unique participant may communicate through the conferencing server 12 to a conference host or to other unique conference participants. Further, a unique user may use GUI 20A, 22A, 24A, 26A to instruct conferencing server 12 to not render 3D images, or to not include 3D options/descriptions of the 3D renderings.

Visually-impaired participants can also ask questions or make comments by inputting via GUI 20A, 22A, 24A, 26A on a participant device, in which braille can be converted to standard text or voice either by the participant device or by the conferencing server 12. Also, the participant's question or comment may be highlighted on a participant device or in the 2D videoconference 16, or an image or object about which the participant has a question or comment, could be given a vibratory motion on the 3D screens (discussed below) of other participants so the other participants can better understand the question or comment.

Each participant device has a respective three-dimensional screen 28, 30, 32, and 34, which can either be a separate device in communication with the associated participant device 20, 22, 24, or 26, or be part of the associated participant device. Each 3D screen 28, 30, 32, and 34 is refreshable, so that the 3D images and braille text it presents change as the videoconference progresses. When the host moves to the subsequent slides, the system 10 refreshes and the process is repeated until the end of the 2D videoconference 16. Screen 28, 30, 32, 34 may be a braille-type device configured to project a 3D rendering of a 2D image or 3D object, and each preferably has a respective GUI 28A, 30A, 32A, and 34A, which may be a touch pad on or next to the associated 3D screen, part of GUI 20A, 22A, 24A, or 26A, or be a separate control or device. GUI 28A, 30A, 32A, and 34A can be utilized by a unique participant to enhance the 3D rendering on the 3D screen with which it is associated, such as by a unique user tapping or otherwise touching the GUI 28A, 30A, 32A, and 34A. The 3D rendering can be enhanced by making it larger or by providing more definition, such as more defined lines, surfaces, indentations, and raised and depressed portions.

The system 10 can have an option to choose from various buffer durations for which images or objects remain on the 3D screen(s). If the host emphasizes a particular portion of a slide, or an object being held by the host, that portion or object on the 3D screen could have a vibratory motion that the visually-impaired participants can recognize by touch. This could aid in understanding the contents of a slide or object in greater detail.

An image recognition engine 36 is in communication with conferencing server 12. Image recognition engine 36 identifies the 2D images in 2D conference data 14 and the relationship or position of the 2D images with respect to text in the 2D conference data 14. An imaging processor 38 is in communication with the conferencing server 12 and with the imaging recognition engine 36. The imaging processor 38 includes software that translates the 2D images of 2D conference data 14 into instructions for 3D renderings that are transmitted through conferencing server 12 to the one or more 3D screens 28, 30, 32, and 34, where the 3D renderings are projected so that a unique participant can touch them. Alternatively, imaging processor 38 may be in direct communication with participant devices 20, 22, 24, and 26, and via the participant devices, be in communication with 3D screens 28, 30, 32, and 34.

An image description engine 40 is in communication with the imaging processor 38 and may be in direct communication with the conferencing server 12. Image description engine 40 may also be part of the imaging processor 38. Image description engine 40 identifies the 2D images of 2D conference data 14 and includes, or accesses, a text-to-braille processor 41 that creates a braille caption/description of each 2D image. Image description engine 40 transmits the braille description to imaging processor 38 or directly to conferencing server 12. The 3D rendering and braille description of the 3D rendering are transmitted directly or indirectly to the refreshable 3D screens 28, 30, 32, and 34 where they are presented in 3D.

A camera 42 is optional and is in direct or indirect communication with the imaging processor 38. Camera 42 may be a still camera or a video camera that sends images of objects (which may be 3D objects) related to the 2D conference that are, for example, held by a conference host or a conference participant. The object images are sent to imaging processor 38 to be converted into 3D renderings. Camera 42 is preferably focused so that it only records objects relevant to 2D conference 16 and not extraneous background or foreground images or objects. Camera 42 may also be used instead of image recognition engine 36 to obtain 2D images being presented in 2D videoconference 16 and transmit them to imaging processor 38.

A scanner 44 is optional and is in communication with the imaging processor 38. A host or conference participant can scan 2D images into scanner 44 and imaging processor 38 converts the 2D images into 3D renderings in the manner described herein.

A text to Braille processor 46 is in communication with conferencing server 12 and detects text in 2D conference data 14 and converts the text to braille via communications through conferencing server 12 to participant devices 20, 22, 24, and 26. As shown, there are two text-to-braille processors 41, 46, although system 10 may have only a single text-to-braille processor that performs the function of both processors 41, 46.

A database 48 may be utilized to store one or more files comprising 2D conference data 14 and/or to store one or more files that include braille text, 3D renderings, and braille descriptions of the 3D renderings.

Figure 2:
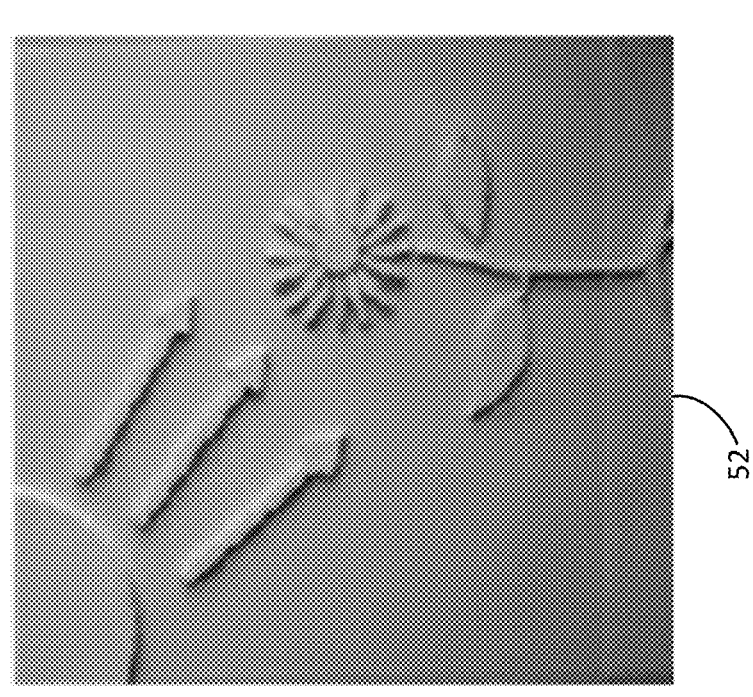
FIG. 2 is an exemplary application of the system of FIG. 1 converting a 2D image into a 3D rendering on a 3D screen.
Figure 2:
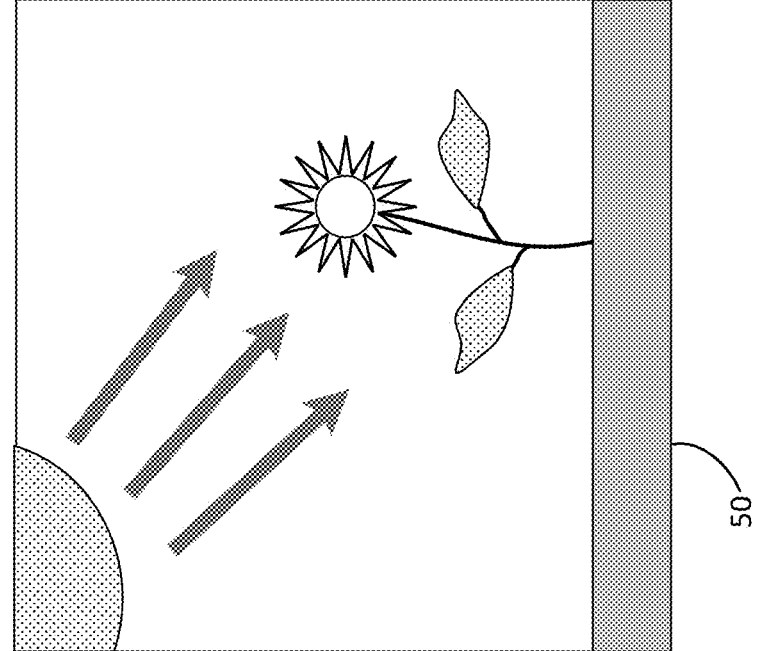
Figure 3:
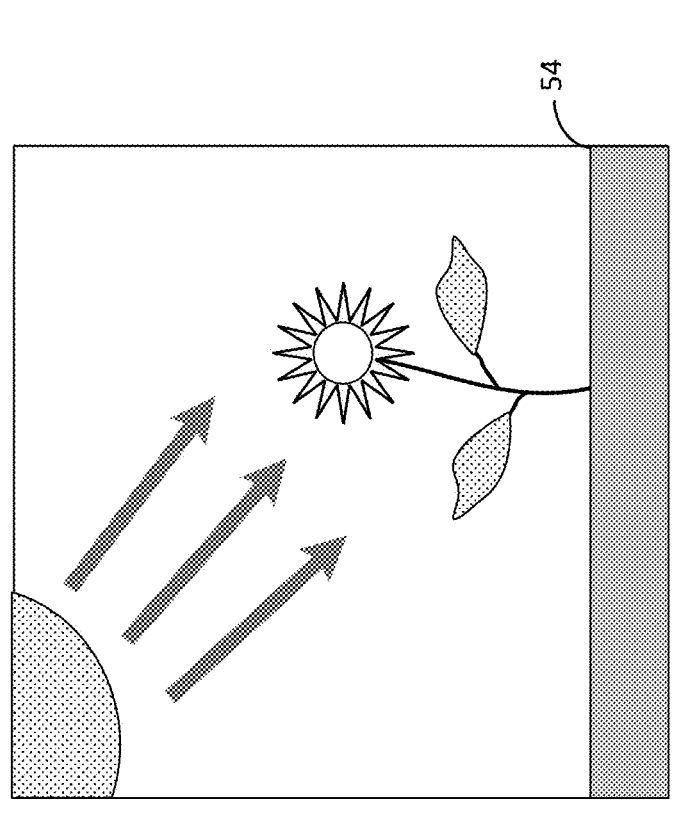
FIG. 3 is an example of an application of the system of FIG. 1 providing a Braille description of an image.
Figure 4:
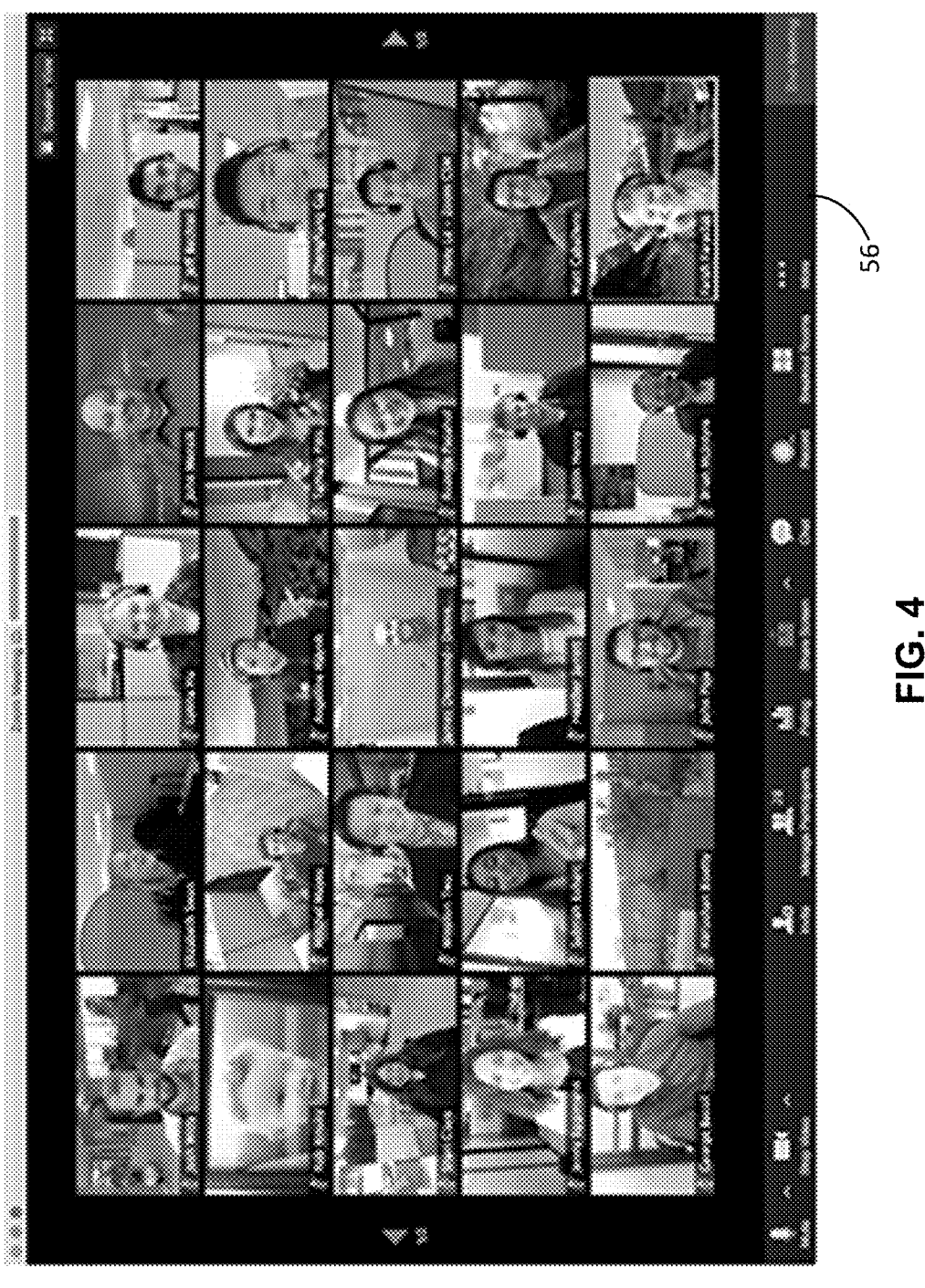
FIG. 4 illustrates participants in a videoconference.
Figure 5:
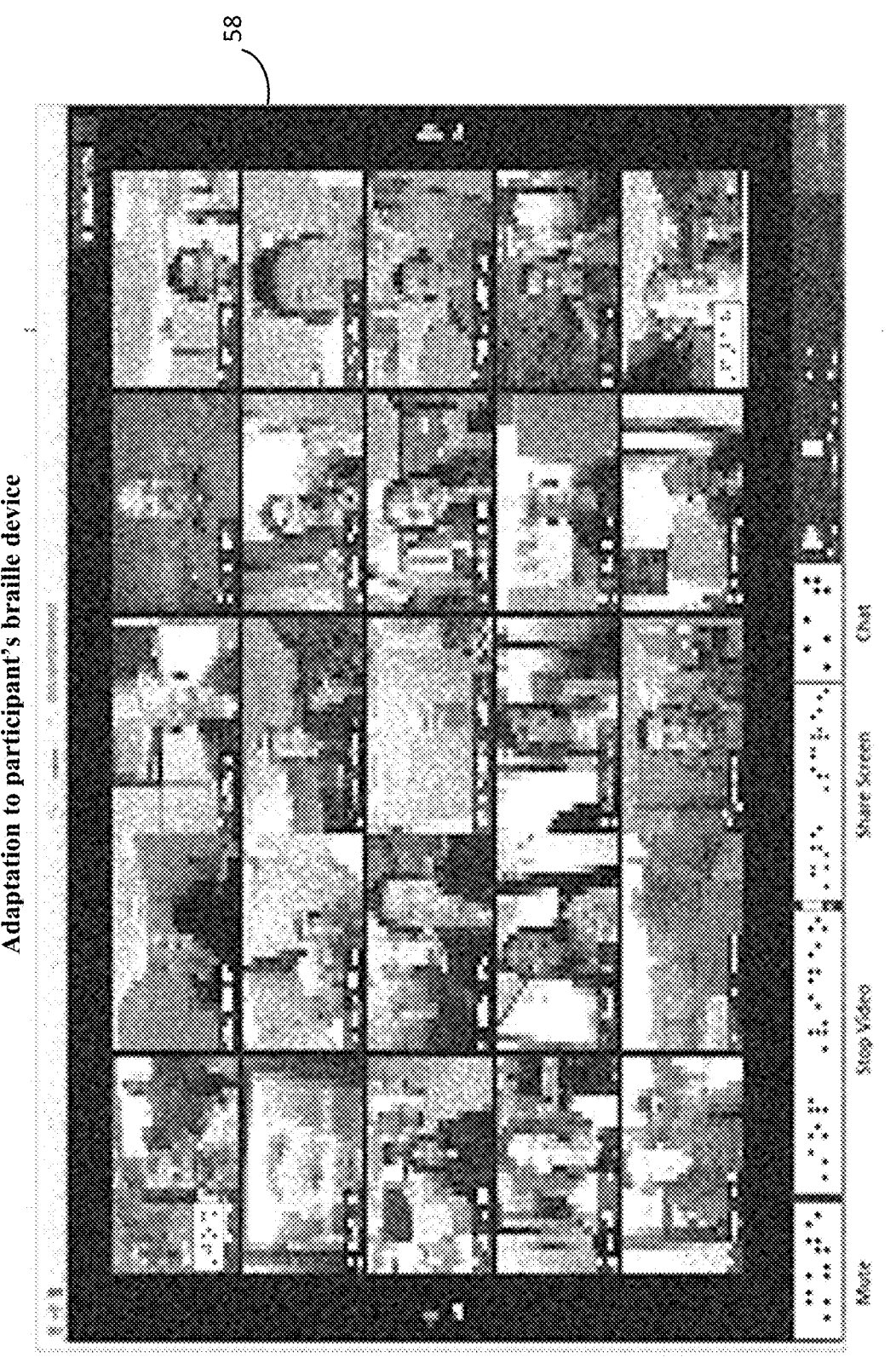
FIG. 5 illustrates a 3D rendering of the participants of FIG. 4.

FIG. 2 illustrates a 2D image of sunlight and a flower 50 converted into a 3D rendering 52 that a visually impaired participant can touch and feel using a system and method of this disclosure. FIG. 3 illustrates a braille caption/description on a sunshine and flower image 54 that identifies the image. FIG. 4 illustrates a videoconference 56 with participants and FIG. 5 illustrates FIG. 4 adopted to 3D rendering 58 with braille image descriptions.

Figure 6:
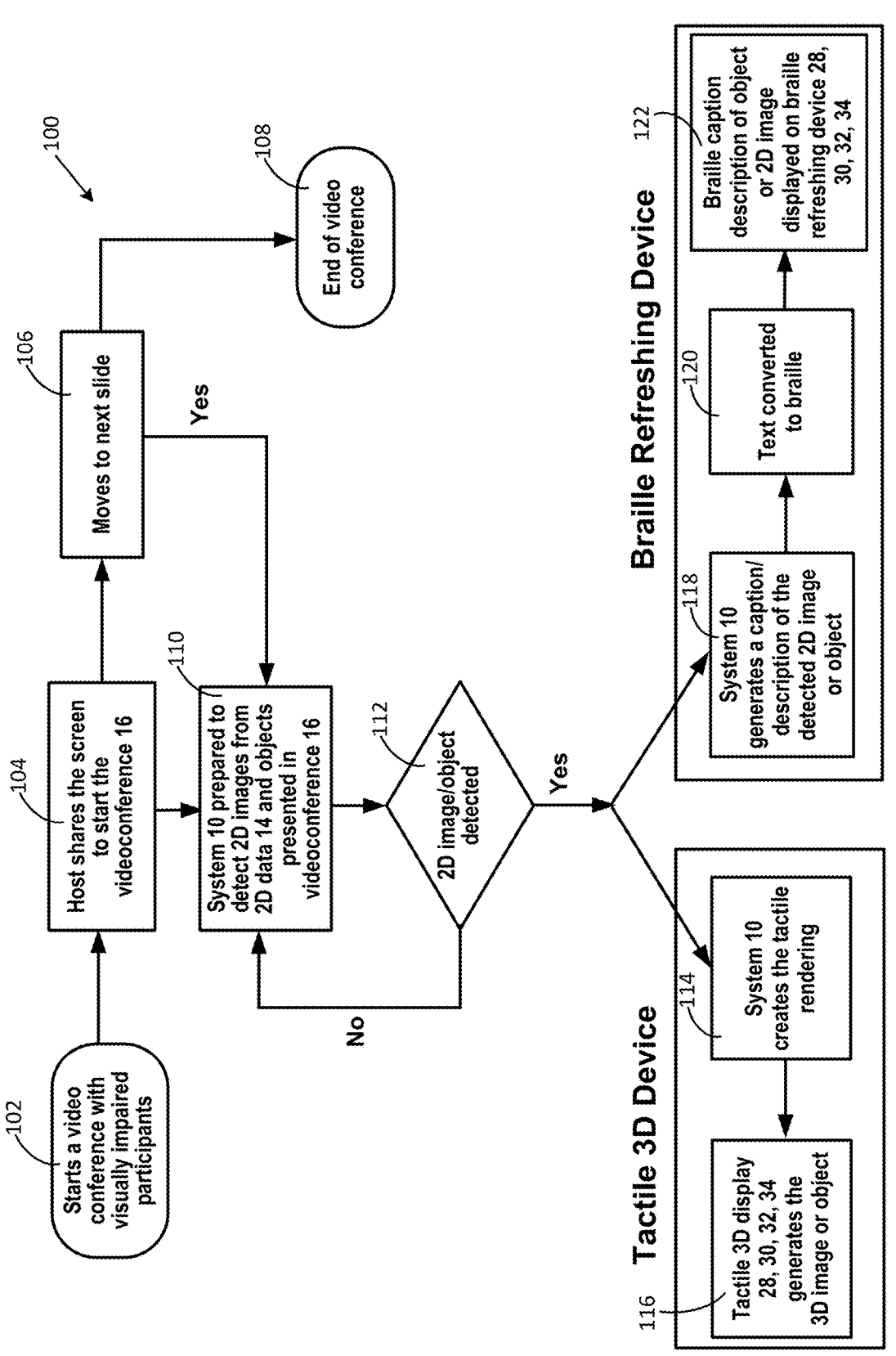
FIG. 6 illustrates a method according to aspects of this disclosure.

FIG. 6 shows a method 100 according to aspects of this disclosure. At step 102 a 2D videoconference 16 starts by conferencing server 12 accessing 2D conference data 14 and presenting videoconference 16. At step 104 the videoconference host shares the videoconference screen and at step 106 the host moves to the next slide. When there are no further slides, the videoconference ends at step 108.

At step 110 system 10 is prepared to detect 2D images in 2D videoconference data 14, or to detect 2D images shown in the 2D videoconference 16. System 10 is also prepared to detect objects shown by the videoconference host or otherwise utilizing camera 42. At step 112, 2D images and/or objects are detected. At step 114 the system 10 creates a tactile rendering of the 2D image(s) or object(s), and at step 116 the tactile 3D display 28, 30, 32, 34 generates a 3D image of the 2D image or the object.

Simultaneously, at step 118, system 10 generates a caption/description of the 2D image or the object. At step 120 the caption/description is converted to braille and at step 122 the braille caption/description created at step 120 is displayed on the braille refreshing device, which may be 3D display 28, 30, 32, 34 or a separate device.

Figure 7:
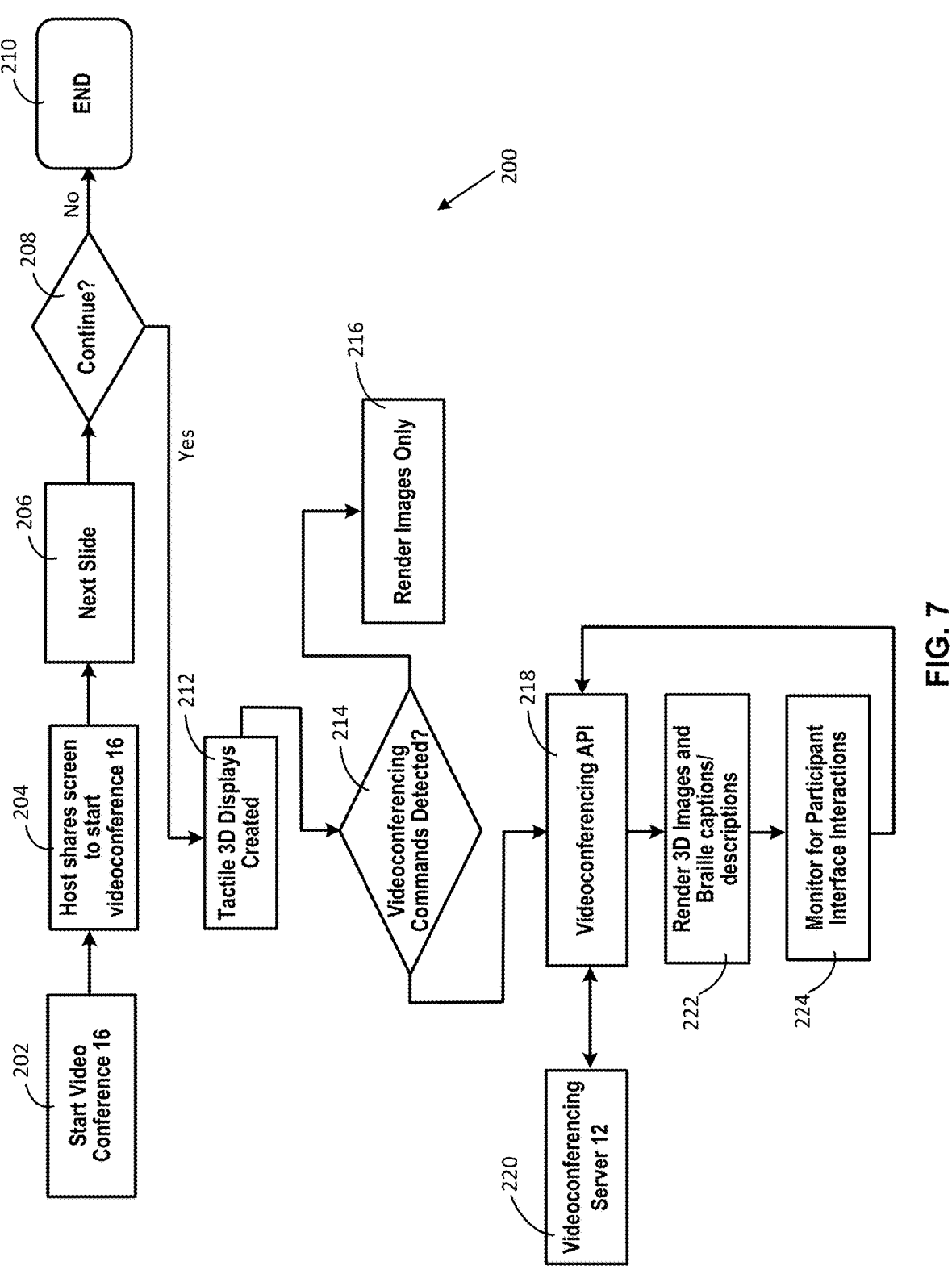
FIG. 7 illustrates a method according to aspects of this disclosure.

FIG. 7 represents another system 200 according to aspects of this disclosure. At step 202 a 2D videoconference 16 is started and at step 204 the host shares the videoconference screen. At step 206 the host moves to the next videoconference slide. At step 208 the host makes a decision to continue the videoconference. If the videoconference does not continue, it ends at step 210. If it continues, at step 212 system 10 creates tactile 3D renderings as described herein. At step 214 visually-impaired participants or the conference host may send commands to the videoconferencing server 12, such as to render 3D images only (step 216) without a corresponding braille caption.

At step 218 a videoconferencing application programming interface (API) can communicate with videoconferencing server 12 (at step 220) and command (at step 222) that the 3D renderings and captions/descriptions of the 3D renderings be provided. At step 224 system 10 monitors for participant interface interactions via participant devices 20, 22, 24, 26, which are transmitted to the videoconferencing API at step 218.

Subsequent post-processing steps might include creating tactile based output such as minutes of a meeting or reading out to a visually-impaired participant through computerized speech.

Other Applications

In the educational field, during an online course/session the same systems and methods can be useful for visually-impaired students to understand more about images that are displayed and motivate them to read in a way that expands their horizons of perception.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A conferencing system for detecting one or more two-dimensional (2D) images in conference data and rendering the images on a three-dimensional (3D) tactile screen, wherein the conferencing system comprises:

a conferencing server that is in communication with one or more participant devices and that is configured to (a) play a 2D conference that includes 2D data comprising the one or more 2D images, and (b) make the 2D data available to one or more participant devices;

an image recognition engine in communication with, or that is part of, the conferencing server and that electronically identifies the one or more 2D images and their position in relation to text in the 2D data;

an imaging processor in communication with the conferencing server and with the image recognition engine, and that includes imaging software configured to create a 3D rendering of the one or more 2D images contained in the 2D data;

an image description engine in communication with the imaging processor and/or the conferencing server, wherein the imaging description engine is programmed to recognize each of the one or more 2D images and generate a tactile description of each; and a tactile 3D screen in communication with the imaging processor and the imaging description engine, wherein the tactile 3D screen is configured to receive the 3D rendering generated by the imaging processor, receive the tactile description generated by the imaging description engine, project the 3D rendering and the tactile description so they can be touched and perceived by a conference participant, and provide greater definition of the 3D rendering in response to touch commands by the conference participant on the 3D screen conference participant device.

2. The conferencing system of claim 1 that further includes a video camera in communication with the imaging processor, wherein the video camera is configured to detect an object within a defined video conferencing field and communicate an image of the object to the imaging processor, wherein the imaging processor creates a 3D rendering of the object image, and the 3D rendering of the object image is transmitted to the tactile 3D screen to that it can be touched and perceived by the conference participant.

3. The conferencing system of claim 2, wherein the 3D rendering of the object is transmitted to the image description engine, which is configured to recognize the object, generate a tactile description of it, and transmit the tactile description to the tactile 3D screen of the participant device so that the tactile description can be touched and perceived by the conference participant.

4. The conferencing system of claim 1, wherein the tactile description is interposed within a Braille rendering of text presented in the 2D data.

5. The conferencing system of claim 2, wherein the object is recognized by the imaging processor using Auto ML Vision Object Detection.

6. The conferencing system of claim 1 that further includes a text-to-Braille processor that converts text in the 2D data to Braille and the Braille is displayed on the tactile 3D screen so that the conference participant can touch and perceive it.

7. The conferencing system of claim 6, wherein the tactile 3D screen includes a refreshable Braille display.

8. The conferencing system of claim 1 that further includes a database to store the 2D data and computerized speech of the 2D data text.

9. The conferencing system of claim 1 that further includes a scanner to scan a 2D image and transfer the scanned 2D image to the imaging processor, which creates a 3D rendering of the 2D scanned image and is configured to transmit the 3D rendering to the tactile 3D screen where it can be touched and perceived by the conference participant.

10. A computerized method for detecting one or more 2D images in 2D data and/or one or more 3D objects, converting each of the one or more 2D images and the one or more 3D objects to 3D renderings, and transmitting the 3D renderings to a 3D tactile screen, wherein the method comprises the steps of:

a conferencing server operating a 2D conference file that includes 2D data, wherein the 2D data comprises the one or more 2D images therein, and the conferencing server making the 2D data available to one or more conference devices, wherein each conference device is unique to a particular conference participant;

utilizing an imaging processor in communication with the conferencing server, creating a 3D rendering of at least one of the one or more 2D images embedded in the 2D data, and transmitting the 3D rendering to a tactile 3D screen;

utilizing an image description engine in communication with the imaging processor (a) recognizing the 3D rendering or the at least one of the one or more 2D images, (b) generate a tactile image description of the at least one of the one or more 2D images or the 3D rendering, and (c) transmit the tactile image description to the tactile 3D screen; and utilizing the tactile 3D screen in communication with the imaging processor and the imaging description engine, receiving the 3D rendering from the imaging processor and receiving the tactile image description from the imaging description engine, and projecting them so they can be touched and perceived by the particular conference participant, and providing greater definition of the 3D rendering in response to touch commands by the conference participant on the 3D screen conference participant device.

11. The method of claim 10, wherein the imaging description engine includes image caption generator software that analyzes the 2D image or the 3D rendering and generates a tactile image description of it.

12. The method of claim 10 that further includes the step of the tactile 3D screen refreshing when a new slide of 2D data is presented.

13. The method of claim 10, wherein (a) a first graphical user interface on the participation device for the unique conference participant includes a control that permits the unique conference participant to choose the duration for which the 3D rendering and the tactile image description remain on the tactile 3D screen, and (b) a second graphical user interface on the conferencing server that includes a second control that permits a conference host to choose the duration for which the 3D rendering and the tactile image description remain on the tactile 3D screen.

14. The method of claim 10, wherein one or more 3D objects are recognized by a video camera with a video conferencing field and that further includes the step of a conference host adjusting the video conferencing field to eliminate extraneous objects, wherein the step of adjusting is based on the location of the one or more 3D objects, the size of the one or more 3D objects, and/or the movement of the 3D objects.

15. The method of claim 10, wherein the participant device includes a GUI configured to permit the unique conference participant to provide comments via Braille.

16. The method of claim 15, wherein the unique conference participant can also input commands via Braille device utilizing the GUI of the participant device.

17. A conferencing system for detecting one or more 2D images in 2D data and rendering the images on a three-dimensional (3D) tactile screen, wherein the conferencing system comprises:

a conferencing server that is in communication with one or more participant devices and that is configured to (a) play a 2D videoconference that includes the 2D data comprising the one or more 2D images, and (b) make the 2D data available to one or more participant devices;

an imaging processor in communication with the conferencing server and that includes imaging software configured to create a 3D rendering of the one or more 2D images contained in the 2D data;

an image description engine in communication with the imaging processor and/or the conferencing server, wherein the imaging description engine is programmed to recognize the each of the one or more 2D images and generate a tactile description of each;

a tactile 3D screen in communication with the imaging processor and the imaging description engine, wherein the tactile 3D screen is configured to receive the 3D rendering from the imaging processor and receive the tactile description from the imaging description engine and project them so they can be touched and perceived by a conference participant;

a conference device having a GUI configured to permit a
   unique conference participant to provide comments via
   Braille and input commands via Braille; and
one or more other conference devices each unique to one
   or more other conference participants, wherein the
   comments or commands of the unique conference
   participant create a vibratory motion on the one or more
   other conference devices so as to be recognized by the
   one or more other conference participants.

18. The conferencing system of claim 17, wherein the
comment or command includes the name of the unique
conference participant who sent it.

19. The conferencing system of claim 17, wherein empha-
sized portions of the conference text are presented with a
vibratory motion on the one or more conference devices.

\* \* \* \* \*